United States Patent
Billiet et al.

(12)

(10) Patent No.: US 6,663,827 B2
(45) Date of Patent: Dec. 16, 2003

(54) RARE EARTH MAGNET ROTORS FOR WATCH MOVEMENTS AND METHOD OF FABRICATION THEREOF

(76) Inventors: Romain L. Billiet, 135 A Malacca Street, Penang 10400 (MY); Hanh Thi Nguyen, 135 A Malacca Street, Penang 10400 (ML)

( * ) Notice: Subject to any disclaimer, the term of this patent is extended or adjusted under 35 U.S.C. 154(b) by 2 days.

(21) Appl. No.: 10/101,024

(22) Filed: Mar. 11, 2002

(65) Prior Publication Data

US 2002/0179185 A1 Dec. 5, 2002

Related U.S. Application Data

(60) Provisional application No. 60/284,688, filed on Apr. 13, 2001.

(51) Int. Cl.⁷ .................................................. B22F 1/00
(52) U.S. Cl. ......................................................... 419/33
(58) Field of Search .............................. 419/38, 36, 32; 75/228, 246; 148/105, 108

(56) References Cited

U.S. PATENT DOCUMENTS 3,953,752 A    4/1976  Bannon
4,035,677 A    7/1977  Kusayama et al.
4,067,101 A    1/1978  Ono
4,095,129 A    6/1978  Tanai et al.
4,206,379 A    6/1980  Onda
4,340,560 A    7/1982  Migeon
4,700,091 A   10/1987  Wuthrich
4,795,598 A *  1/1989  Billiet ........................ 264/40.6
4,888,507 A   12/1989  Plancon et al.
5,705,970 A *  1/1998  Nishida et al. ............. 335/303

FOREIGN PATENT DOCUMENTS

JP    57021946   *  9/1993
JP    61291901   *  9/1993

* cited by examiner

Primary Examiner—Daniel J. Jenkins

(57) ABSTRACT

Rotors for stepping motors used in analog timepieces are produced from a mixture of prealloyed rare earth magnetic particles and a thermoplastic binder. The mixture is either tape cast in a magnetic field following blanking of green rotors or injection molded in a magnetic field. Following extraction of the binder the green parts are sintered to net shape. Improved magnetic properties, smaller dimensions, better tolerances and 100% material utilization are claimed.

14 Claims, No Drawings

RARE EARTH MAGNET ROTORS FOR WATCH MOVEMENTS AND METHOD OF FABRICATION THEREOF

CROSS-REFERENCE TO RELATED APPLICATIONS

This application claims priority to U.S. Provisional Patent Application Serial No. 60/284,688 filed on Apr. 13, 2001.

This invention is related to U.S. patent application Ser. No. 09/962,526 entitled: 'Method For Controlling The Dimensions Of Bodies Made From Sinterable Materials' and to Provisional Patent Application Serial No. 60/270,180 entitled: Method For Making Articles From Nanoparticulate Materials.

REFERENCES CITED

U.S. Patent Documents

| | | | |
|---|---|---|---|
| 2,488,729 | November 1949 | Kooyman | 171/209 |
| 3,943,698 | March 1976 | Ono | 58/23 |
| 3,953,752 | April 1976 | Bannon | 310/156 |
| 4,035,677 | July 1977 | Kusayama, et al. | 310/42 |
| 4,067,101 | January 1978 | Ono | 29/598 |
| 4,095,129 | June 1978 | Tanai, et al. | 310/49 R |
| 4,206,379 | June 1980 | Onada | 310/156 |
| 4,340,560 | July 1982 | Migeon | 264/249 |
| 4,700,091 | October 1987 | Wuthrich | 310/49 |
| 4,888,507 | December 1989 | Plancon, et al. | 310/40 MM |

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

1. Field of Invention

The present invention relates to electrical stepping motors, and more particularly, to micro-miniature stepping motors used to drive the gear works for turning the time-indicating hands in quartz analog timepieces.

2. Description of Prior Art

A stepping motor is one that rotates by way of short, essentially uniform angular movements rather than continuously. An important application of stepping motors is in electronic watches having an analog display formed by rotating hands. In a watch of this type, low-frequency timing pulses, derived by frequency division from a high frequency crystal-controlled time base, serve to actuate a stepping motor which drives the gear works rotating the hands of the watch.

Various types of stepping motors are known which make use of a rotor incorporating a drive member such as a gear pinion, a permanent magnet, usually having two poles, and a pinion shaft with journals rotatably mounted in the watch movement. The permanent magnet is often in the shape of a ring with a central hole through it for the pinion shaft. A typical shape would be a toroid measuring about 1.50 mm O.D.×0.35 mm I.D.×0.50 mm thick.

In the context of an electronic watch, the stepping motor must not only be in micro-miniature form to minimize space requirements, in order to make same particularly suitable for use in a small sized wristwatch, but its power consumption must be extremely low. In order to energize the watch with a miniature power cell which will last at least a year, the allowable power consumption is usually less than 8 microwatts. Another desirable characteristic of a stepping motor rotor is that it have a low moment of inertia about its axis of rotation.

Permanent magnets used for watch rotors, typically anisotropic rare earths such as samarium-cobalt, are extremely brittle and difficult to machine. Because of the small size of the rotor, close tolerances are required in the stepping motor. Various improvements have been suggested to reduce breakage of the magnets and to reduce the cost of manufacturing a stepping motor rotor.

The possibility of breakage increases when designs require a press fit of the magnet material to the rotor pinion shaft, or when compressive forces on the outer diameter are necessary to hold it in place on the rotor. Protective bushings have been used to prevent breakage but, since the moment of inertia varies as the square of the radius of rotation, the use of protective bushings between the inner diameter of the magnet and the rotor shaft or the use of metallic shells encasing the outer diameter of the magnet is to be avoided.

Examples of prior art rotor assemblies with plastic internal bushings disposed between the shaft and the magnet are shown in Onda, U.S. Pat. No. 4,206,379; Bannon, U.S. Pat. No. 3,953,752; Kooyman, U.S. Pat. No. 2,488,729 and Migeon, U.S. Pat. No. 4,340,560.

An example of a stepping motor rotor with permanent magnet clamped axially between metal bushings press fit with an interference fit to the rotor shaft is seen in Kusayama, U.S. Pat. No. 4,035,677.

Constructions where the inner hole diameter of the permanent magnet is finished and pressed directly onto the rotor shaft are shown in Ono, U.S. Pat. No. 3,943,698 which uses a reinforcing plate of stainless steel or other non-magnetizable material bonded to the magnet to prevent cracking the brittle material.

A rotor assembly which employs a radial wall and outer protective metal sheath into which the magnet is press fit on its outer diameter is disclosed in Tanai, U.S. Pat. No. 4,095,129. Although this permits forming the inner diameter of the rare earth magnet by a rough drilling process, the outer metallic protecting sheath both increases the moment of inertia and offer the possibility of breakage by compressive stresses due to the press fit on the outer diameter of the magnet.

The magnet rotor must hold its strength under adverse conditions, otherwise it will change in its performance. Hence, high coercivity and temperature stability are essential. Finally, in order to reduce the magnet volume and weight, it is important that the magnet have a high energy product (BHmax). Typically, the specification for the energy product of rare earth watch rotors is at least 22 MGOe (170 kJ/m3).

Only the rare earth permanent magnet materials samarium-cobalt, $Sm_2Co_{17}$, and neodymium-iron-boron, $Nd_2Fe_{14}B$, usually shortened to just NdFeB, have energy products greater than 22 MGOe (170 kJ/m3). $Sm_2Co_{17}$ has a high energy product at about 30 MGOe (238 kJ/m3) and high coercivity at about 10 KOe. Stable at temperatures up to 350° C. it is also very resistant to corrosion. Its disadvantages are its high cost and difficulty to machine.

NdFeB has an exceptionally high energy product at about 40 MGOe (318 kJ/m3) and exceptionally high coercivity at about 15 KOe. Relatively easy to machine and relatively inexpensive, the major disadvantage of NdFeB magnets is their poor corrosion resistance and instability above 150° C. These shortcomings severely limit their application.

Studies aimed at improving the corrosion resistance of NdFeB magnets have mostly emphasized protective coatings or the addition of alloying elements, however, the effectiveness of coatings is not always assured and alloying to increase the corrosion resistance usually reduces magnetic properties. While new corrosion resistant NdFeB alloys may change the situation in future, the current use of $Sm_2Co_{17}$ for quality watch rotors is almost universal.

$Sm_2Co_{17}$ magnets are anisotropic and must be magnetized in the orientation direction. Hence, the provision of a prealloyed powder is a prerequisite. The process starts by vacuum induction melting a carefully optimized blend of alloying ingredients and casting a $Sm_2Co_{17}$ ingot. The ingot is then crushed under protective atmosphere to a coarse, typically minus 50 mesh (297 micron) prealloyed powder. The resulting powder is further coarse ground, usually by autogenous grinding under hydrogen atmosphere in a heated cylindrical mill (hydrogen decrepitation method). Finally, the powder is jet milled under high pressure (about 120 psi) $N_2$ to a critical size depending on the size of individual crystallites. Following screening to remove undesirable undersize and oversize particles the highly pyrophoric powder is stored under argon atmosphere until ready for pressing.

Pressing starts by blending a powder mixture based on chromatography results. Depending on the type of magnet being produced, the powder is either isostatically pressed into a block—the method used in the fabrication of watch rotors—or die pressed to a particular component shape. In either case the operation is conducted in a pulsed magnetic field (typically 10 kOe). The effectiveness of the pulses in magnetically aligning the crystallites diminishes as the powder is being compacted. During the latter part of the pressing step, stresses introduced as a result of plastic deformation as well as density gradients may lead to a less than perfect grain alignment.

Although the magnetic properties of isostatically pressed parts are usually higher than those of pressed parts, the uniformity of the magnetic characteristics of the former is usually lower than that of the latter. After pressing, the block or shapes are demagnetized with a decaying 60 Hz field.

Sintering is performed in high vacuum. The partial formation of liquid phase during sintering affects the angularity tolerance of the magnetization. This, combined with imperfect grain alignment results in difficulties to achieve the theoretical maximum energy product of $Sm_2CO_{17}$.

Sintering is followed by quenching and aging. The intrinsic coercivity is defined during the quenching step. The presence of large amounts of non-magnetic secondary phase adversely affects the energy product. The sintered ingots are diamond-sawed to the required dimensions and ground to the required tolerance. The blocks are normally pulse magnetized at 40–50 kOe before shipping unless magnetization of the final machined product—as in the case of watch rotors and disk drive magnets—is performed at the end users' facilities in which case they are shipped in the unmagnetized state.

Magnet blocks destined for watch rotors typically measure about 200 mm×50 mm×38 mm. First the ingot is diamond-sawed into roughly 0.5 mm thick slabs. Each slab is then cut into roughly 1.5 mm wide strips and each strip is further cut into roughly 1.5 mm square chips. The chips are then centerless-ground to the precise outside diameter. Next, each separate round has a hole drilled in it using an Excimer laser. The rough edges of the laser-drilled hole must be ground to the precise inside diameter, an operation requiring stringing up the toroids on a tungsten wire lubricated with diamond paste, and jigging the wire back and forth through the stacked parts rigidly held in place in a bath of frozen low temperature fusible metal alloy. Finally, the rotors are spot welded onto the pinion shaft using a laser beam.

Considering the rotor dimensions given above, a typical sawing kerf width of 0.5 mm and 100% yield, it is easily determined that, out of a 200 mm×50 mm×38 mm magnet ingot, only 20% of the material is effectively turned into rotors. Practically, due to poor grinding yield, actual material utilization is rarely higher than 10–14%

As can be inferred from above explanations, the prior art process of making $Sm_2Co_{17}$ watch rotors is complex, time-consuming, labor-intensive, and wasteful in terms of material and energy utilization.

BRIEF SUMMARY OF THE INVENTION

In accordance with the present invention the labor-intensive and inefficient techniques of the prior art are substantially overcome by forming rare earth watch rotors from a mixture of prealloyed rare earth magnetic particles and a thermoplastic binder. Green watch rotors are produced by either casting the mixture into a tape in a magnetic field, followed by blanking of the rotors or, alternatively, by injection molding the mixture in a mold cavity placed in a magnetic field. Following extraction of the binder the green parts are sintered to net shape. Improved magnetic properties, smaller dimensions, better tolerances and 100% material utilization are thus achieved.

OBJECTS AND ADVANTAGES

It is the primary object of this invention to provide an economic, simple, energy and material efficient process to mass-produce rare earth magnet rotors for quartz watches.

An additional object of this invention is to provide a method to fabricate rare earth watch rotors that are smaller in size and with greater dimensional precision than in the prior art.

Fine prealloyed samarium cobalt powder being extremely reactive and pyrophoric, sintering of the prior art ingots is necessarily performed as soon as possible after the cast ingot has been crushed and milled into a powder. As a result, the vacuum induction melting, casting, comminution, pressing and sintering of the samarium cobalt alloy are, of necessity, carried out in the same facilities. This situation has lead to a virtual monopoly over rare earth magnet manufacturing by a handful of manufacturers.

It is an object of this invention to reduce the end user's dependence on suppliers of sintered samarium-cobalt and other permanent magnet ingots. Samarium in solid or powder form can be easily obtained from suppliers who are not magnet producers themselves. Likewise cobalt in granules, flakes or powder can be easily procured from cobalt producers. Sourcing raw materials from non magnet producers inherently entails substantial cost reductions. Samarium-cobalt alloys can be cast by any foundry equipped with a vacuum induction furnace. Likewise crushing and rough grinding of the cast ingot does not represent any problem since it is only the fine jet milled powder that becomes pyrophoric. Hence this invention has the potential to dramatically reduce the raw material cost for rare earth magnets.

Conventional isostatic pressing of samarium-cobalt ingots in a magnetic field is done with bulky isostatic presses which represent a sizeable investment. This invention does not require such investment. Furthermore, as no pressing is involved there are no stresses nor density gradients when sintering is initiated.

This invention bypasses the entire samarium-cobalt powder pressing, ingot sintering and machining process, replacing it with a simple, economical, zero-waste and environmentally clean process eminently suited to automation.

Finally this invention allows for higher energy products to be realized than by using the prior art methodology as magnetic alignment of the particulates is optimized as it takes place while the binder is in a fluid condition and the magnetic particles have more freedom of movement than when they are isostatically pressed together as is the prior art.

BRIEF DESCRIPTION OF THE SEVERAL VIEWS OF THE DRAWINGS

Not applicable.

DETAILED DESCRIPTION OF THE INVENTION

Essentially this invention is based on producing a moldable compound from which green rotors can be formed either by blanking them from a tape cast in a magnetic field or by injection molding them in a mold cavity placed in a magnetic field.

In either case the moldable compound must meet a number of essential requirements. First, the magnetic particles need to be brought as closely as possible in contact with each other, i.e. the green density must be maximized. The higher the green density the smaller the shrinkage upon sintering and the better the control over the final dimensions of the end product. The green density must also be isotropic to avoid density gradients upon sintering. The green mixture or slip must have the proper rheology to allow it to be extruded, doctor bladed or injection molded.

Prior to shaping of the rotors, the compound's viscosity must be low enough so as to allow the magnetic particles sufficient freedom of motion so that they will tend to align their magnetic axis under the influence of a pulsating magnetic field. This condition is required regardless of the method used to form the green rotors, i.e. tape casting or molding.

Obtaining a dispersion of magnetic particles with a high green density and optimized rheology for extruding, tape casting or molding is rendered possible by following the precepts provided in these inventors' Provisional Patent Application Serial No. 60/270180 entitled: Method For Making Articles From Nanoparticulate Materials.

In a first step of applying this invention, raw prealloyed materials conforming as closely as possible to the desired end specification of the $Sm_2Co_{17}$ material are obtained. The raw materials should be in particulate form with a particle size acceptable to an attrition mill. For example, a suitable starting material could be the minus 50 mesh crushed $Sm_2Co_{17}$ ingot material of the prior art.

The duration and intensity of the ball milling or mechanical attrition action, and consequently the final particle size distribution of the particulates will be dictated by the targeted magnetic properties. Hence the final particle size will be different depending of the type of magnet material to be produced, e.g. $Sm_2Co_{17}$, $SmCo_5$, NdFeB, etc.

After the attrition step the magnetic particulates are desorbed under high vacuum following which 25–50% of the particle surface is coated with a monolayer of surfactant. The thus partially surfactant-coated magnetic particles are dispersed in a measured quantity of a thermoplastic matrix to yield a mixture that can be tape cast, extruded or injection molded.

The tape casting or doctor blade casting machine is of the type used to produce alumina substrates for the electronics industry. The slip viscosity is adjusted by the judicious use of plasticizers. The tape is cast onto a moving cellulose acetate carrier film. The height of the doctor blade is adjusted by means of micrometer screws to produce the desired rotor thickness upon sintering.

Immediately upon emerging from the doctor blade the acetate film passes across the gap of an electromagnet where a strong pulsing magnetic field exerts a torque on the magnetic particles in the tape, inducing their alignment with the field lines. The set up of the tape passing across the magnetic field is similar to the recording head of a $Fe_2O_3$ magnetic tape. The frequency and intensity of the magnetic pulses are adjusted so as to produce a jigging action on the particles causing their magnetic axis to align with the field lines of the magnetic field.

In the case of extrusion, the viscosity of the thermoplastic compound is adjusted so that a tape can be extruded. The extrusion nozzle can be located directly inside the magnetic field created by the electromagnet so that the tape will have all the particles aligned upon emerging from the extrusion nozzle. Alternatively the magnetization can take place immediately downstream of the extrusion nozzle.

Simultaneously with or immediately following the magnetic alignment the mobility of the magnetic particles is impaired by rapidly increasing the viscosity of the tape. In the case of the cast tape this is normally done by 'drying' it, i.e. by removing part or all of one or several of the organic binder constituents. The incorporation of a UV curable agent in the organic binder formulation and use of ultraviolet radiation at this point is an option. In the case of the extruded tape, consolidating normally takes place by cooling.

As soon as the tape becomes semi-solid rotors are punched out of it to an oversize dimension allowing for shrinkage during firing. By following the precepts provided in these inventors' patent application Ser. No. 09/962,526 entitled: 'Method For Controlling The Dimensions Of Bodies Made From Sinterable Materials', extremely precise final dimensions can be realized and watch rotors much smaller than what the prior art can currently achieve are rendered possible. All of the unused part of the tape can be recycled as it has not been sintered yet, resulting in 100% material utilization.

In the case of forming the rotors by injection molding magnetization takes place in the mold cavity itself in much the same way as is done for plastic IM (Injection Molded) bonded rare earth magnets.

Techniques for dewaxing and sintering of green rotors are well described in the prior art and will not be elaborated on here.

CONCLUSION, RAMIFICATIONS AND SCOPE

In conclusion, the major advantage of this invention resides in the ability to economically mass-produce samarium cobalt rotors for stepping motors used in the movements of electronic timepieces.

The practical uses of this invention are clearly broad in scope and universal and attempting to enumarate them all would not materially contribute to the description of this invention. For example, the ability to fabricate a multitude of products from a variety of magnetic materials via a plastic forming process such as tape casting, extrusion or injection molding rather than by machining bulk alloys has far reaching applications in virtually every field of industry.

Though the invention has been described with respect to specific preferred embodiments thereof, mainly with reference to $Sm_2Co_{17}$, many other magnetic alloys like NdFeB, or any of the more recently developed magnetic alloys such as the so-called modified NdFeB gadolium-added $Sm_2Co_{17}$, samarium-iron-nitride, $Sm_2Fe_{17}N_3$, or the so-called ferrite neo-hybrids, etc., can also be made and many variations and modifications of the invention will immediately become apparent to those skilled in the art. It is therefore the intention that the appended claims be interpreted as broadly as possible in view of the prior art to include all such variations and modifications.

We claim as our invention:

1. A method for producing rotors for stepping motors used in the movements of electronic timepieces, comprising:
   a. providing prealloyed rare earth magnetic alloys in particulate aggregate form,
   b. attriting a predetermined volume of said prealloyed rare earth particulate materials under a protective non-reactive fluid blanket having substantially higher density than that of water and breaking up the aggregates and mechanically removing adsorbed volatiles, moisture, atmospheric gases or contaminants from the surface of said prealloyed rare earth particulate materials or from the fresh surfaces generated during attrition,
   c. separating the contaminants thus removed from the deaggregated particulates,
   d. removing the protective fluid blanket from the thus decontaminated deaggregated particulates using vacuum distillation,
   e. desorbing the surface of the said particulates by applying a sufficiently high vacuum,
   f. allowing a predetermined volume of a suitable surfactant to adsorb onto the surface of the said particulates such that at least 25% and at most 50% of the said particulates' surface is coated with a monolayer of surfactant,
   g. dispersing said partially surfactant-coated particulates in a predetermined volume of a suitable degradable thermoplastic binder to form a homogeneous thermoplastic compound,
   h. tape casting said thermoplastic compound and exposing said tape casting to a magnetic field,
   i. punching a green rotor from the said tape and subsequently dewaxing and sintering said green rotor.

2. The method of claim 1 wherein the prealloyed magnetic materials are selected from the class of rare earth magnetic alloys such as $Sm_2Co_{17}$; $SmCo_5$; $Nd_2Fe_{14}B$; $Sm_2Fe_{17}N_3$, or blends of these alloys with other alloys.

3. The method of claim 2 wherein the said thermoplastic compound contains a UV curable ingredient and wherein the said cast tape is subjected to UV radiation immediately following magnetization.

4. A product made by the method of claim 3.

5. A product made by the method of claim 2.

6. The method of claim 1 wherein the prealloyed magnetic materials are selected from the class of rare earth magnetic alloys such as $Sm_2Co_{17}$; $SmCo_5$; $Nd_2Fe_{14}B$; $Sm_2Fe_{17}N_3$, or blends of these alloys with ferrites.

7. The method of claim 1, wherein said magnetic field exerts a strong pulsing magnetic field that exerts a torque onto magnetic particles in the tape.

8. The method of claim 1, wherein the magnetic field aligns magnetic particles in the tape, further comprising rapidly increasing the viscosity of the tape immediately following said alignment of said magnetic particles.

9. The method of claim 1, wherein the magnetic field aligns magnetic particles in the tape, further comprising rapidly increasing the viscosity of the tape simultaneously with said alignment of said magnetic particles.

10. The method of claim 1, further comprising rapidly increasing the viscosity of the tape immediately following tape casting of said thermoplastic compound in a magnetic field.

11. The method of claim 1, wherein the magnetic field aligns magnetic particles in the tape, and wherein said degradable thermoplastic binder includes a UV curable agent, the method further comprising rapidly increasing the viscosity of the tape simultaneous with said alignment of said magnetic particles by utilizing ultraviolet radiation.

12. The method of claim 1, wherein said tape is casted onto a moving cellulose acetate carrier film.

13. The method of claim 1, wherein said magnetic field exerts a strong pulsing magnetic field onto magnetic particles in the tape.

14. The method of claim 1, wherein said magnetic field exerts a strong pulsing magnetic field that exerts a torque onto magnetic particles in the tape.

* * * * *